(12) United States Patent
Choi et al.

(10) Patent No.: US 11,599,543 B2
(45) Date of Patent: *Mar. 7, 2023

(54) ROUTING SQL STATEMENTS TO ELASTIC COMPUTE NODES USING WORKLOAD CLASS

(71) Applicant: SAP SE, Walldorf (DE)

(72) Inventors: Jaeyoung Choi, Seoul (KR); Deok Hoe Kim, Seoul (KR); Kyu Hwan Kim, Gwacheon (KR); Chae Kwang Lee, Suwon (KR); Jane Jung Lee, Seoul (KR); Juchang Lee, Seoul (KR)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/826,060

(22) Filed: May 26, 2022

(65) Prior Publication Data
US 2022/0318249 A1 Oct. 6, 2022

Related U.S. Application Data

(63) Continuation of application No. 17/217,412, filed on Mar. 30, 2021, now Pat. No. 11,379,483.

(51) Int. Cl.
*G06F 16/22* (2019.01)
*G06F 16/2455* (2019.01)
(Continued)

(52) U.S. Cl.
CPC ............ *G06F 16/24553* (2019.01); *G06F 16/2282* (2019.01); *G06F 16/248* (2019.01); *G06F 16/24537* (2019.01)

(58) Field of Classification Search
CPC .......... G06F 16/24553; G06F 16/2282; G06F 16/24537; G06F 16/248; G06F 16/22;
(Continued)

(56) References Cited

U.S. PATENT DOCUMENTS 10,791,168 B1 9/2020 Dilley et al.
2011/0208858 A1* 8/2011 Yancey ................. G06F 16/219
709/224

(Continued)

OTHER PUBLICATIONS

Extended European Search Report, European Patent Application No. 2215723 8.1, 9 pages, dated Aug. 8, 2022.
(Continued)

*Primary Examiner* — Wilson Lee
(74) *Attorney, Agent, or Firm* — Klarquist Sparkman, LLP

(57) ABSTRACT

Technologies are described for routing structured query language (SQL) statements to elastic compute nodes (ECNs) using workload classes within a distributed database environment. The elastic compute nodes do not store persistent database tables. For example, a SQL statement can be received for execution within the distributed database environment. A workload class can be identified that matches properties of the SQL statement. Based on the workload class, a routing location hint can be obtained that identifies a set of elastic compute nodes. The SQL statement can then be routed to one of the identified elastic compute nodes for execution. Execution of the SQL statement at the elastic compute node can involve retrieving database data from other nodes which store persistent database tables.

20 Claims, 6 Drawing Sheets

(51) Int. Cl.
*G06F 16/248* (2019.01)
*G06F 16/2453* (2019.01)

(58) Field of Classification Search
CPC .............. G06F 16/24; G06F 16/2228; G06F 16/2264; G06F 16/2272; G06F 16/242; G06F 16/244; G06F 16/2433
See application file for complete search history.

(56) References Cited

U.S. PATENT DOCUMENTS

| | | |
|---|---|---|
| 2014/0337364 A1 | 11/2014 | Agarwal et al. |
| 2016/0191363 A1* | 6/2016 | Haraszti ............. H04L 43/0888 709/223 |
| 2017/0083380 A1* | 3/2017 | Bishop ................. G06F 9/5083 |
| 2018/0013692 A1 | 1/2018 | Park et al. |
| 2018/0246945 A1 | 8/2018 | Lee et al. |
| 2018/0349418 A1 | 12/2018 | Lee et al. |
| 2019/0068699 A1 | 2/2019 | Nethercutt et al. |
| 2019/0228095 A1* | 7/2019 | Ergun ................... G06F 16/951 |
| 2020/0233861 A1 | 7/2020 | Mathur |
| 2021/0011928 A1 | 1/2021 | Becker et al. |
| 2021/0034598 A1* | 2/2021 | Arye ..................... G06F 16/288 |
| 2021/0216983 A1* | 7/2021 | Glickman ........... H04L 63/0414 |
| 2022/0038544 A1 | 2/2022 | Grinstein et al. |

OTHER PUBLICATIONS

Lee et al., "SAP HANA Distributed In-Memory Database System: Transaction, Session, and Metadata Management," *2013 IEEE 29th International Conference on Data Engineering (ICDE)*, pp. 1165-1173, Apr. 8, 2013.

SAP, "SAP HANA Administration Guide, Workload Management," <https://help.sap.com/viewer/66944450942e495c83a19646e7031056/2.0.03/en-US>, 30 pages (accessed Feb. 27, 2021).

* cited by examiner

US 11,599,543 B2

ROUTING SQL STATEMENTS TO ELASTIC COMPUTE NODES USING WORKLOAD CLASS

CROSS REFERENCE TO RELATED APPLICATION

This application is a continuation of U.S. patent application Ser. No. 17/217,412, filed Mar. 30, 2021, and titled "ROUTING SQL STATEMENTS TO ELASTIC COMPUTE NODES USING WORKLOAD CLASS," which is incorporated herein by reference in its entirety.

BACKGROUND

In a distributed database system, it is important to route structured query language (SQL) statements to the right worker node (e.g., to the worker node that can process the SQL statements most efficiently). Distributed database systems typically route SQL statements to worker nodes based on data affinity. For example, if a SQL statement uses data from a particular database table, then the SQL statement can be routed to a worker node at which the particular database table is stored.

In the SAP® Hana® distributed database system, there is an automatic SQL statement routing system which is referred to as client-side statement routing. At SQL compilation time, the client-side statement routing mechanism determines which worker node has the data set needed for a given SQL statement, and then caches that worker node's location client side. When the same SQL statement is executed in the future, the client side automatically routes the SQL statement directly to the determined worker node. While such automatic client-side statement routing can be efficient in some situations, it does not provide flexibility in controlling the distribution of workloads.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for routing structured query language (SQL) statements to elastic compute nodes (ECNs) using workload classes within a distributed database environment. The elastic compute nodes do not store persistent database tables. For example, a SQL statement can be received for execution within the distributed database environment. A workload class can be identified that matches properties of the SQL statement. Based on the workload class, a routing location hint can be obtained that identifies a set of elastic compute nodes. The SQL statement can then be routed to one of the identified elastic compute nodes for execution. Execution of the SQL statement at the elastic compute node can involve retrieving database data from other nodes which store persistent database tables.

DETAILED DESCRIPTION

Overview

Figure 1:
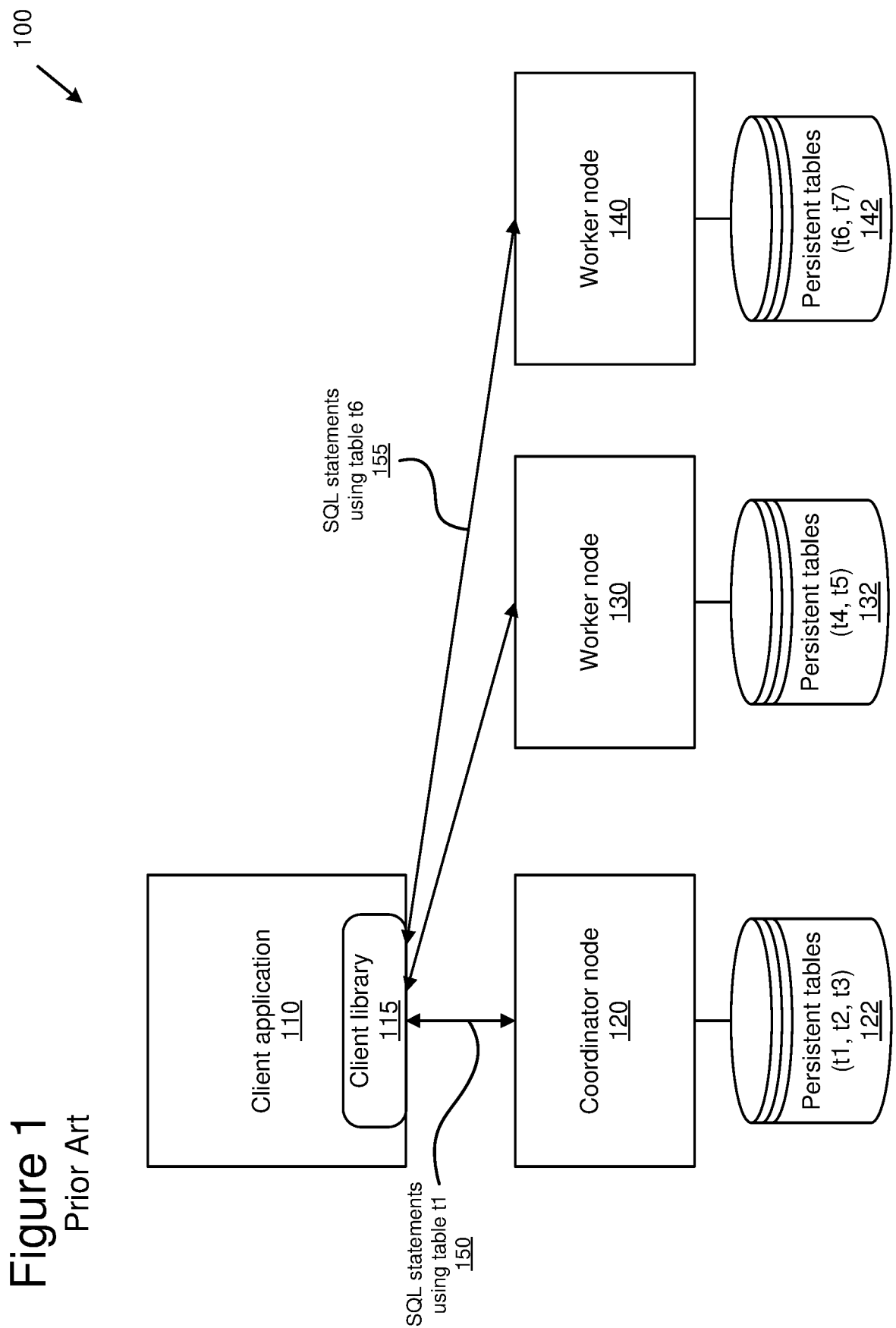
FIG. 1 is an example prior art environment, comprising a coordinator node and worker nodes, for routing SQL statements.

The following description is directed to technologies for routing structured query language (SQL) statements to elastic compute nodes (ECNs) using workload classes within a distributed database environment. For example, a SQL statement can be received for execution within the distributed database environment. A workload class can be identified that matches properties of the SQL statement. Based on the workload class, a routing location hint can be obtained that identifies a set of elastic compute nodes. The elastic compute nodes do not store persistent database tables. The SQL statement can then be routed to one of the identified elastic compute nodes for execution. Execution of the SQL statement at the elastic compute node can involve retrieving database data from other nodes which store persistent database tables.

In some prior solutions, the user can route specific statements to specific nodes. For example, the SAP "route_to" hint can be entered for a given query to route the query to a given node. However, the "route_to" hint needs to be set for each query and is therefore time consuming and inconvenient to use. In addition, it cannot be used to control routing of a workload class.

Using the technologies described herein, workload class mappings can be used to control routing of SQL statements to specific nodes, including elastic compute nodes. Using this technology, the user is able to define workload classes (and associated mappings and routing location hints) to control how specific groups of SQL statements (e.g., based on properties, such as session or other properties) will be routed. For example, the user can identify specific compute-intensive workloads and route them to specific elastic compute nodes, while routing other types of workloads (e.g., non-compute-intensive) to other nodes (e.g., to coordinator nodes, worker nodes, and/or other types of nodes). This solution provides control of SQL statement routing and improves efficiency of the distributed database environment (e.g., reducing congestion, improving response time, etc.). In addition, the technologies described herein that use workload class mappings provide advantages over using a technology such as a "route_to" hint. For example, modifying the query string with "route_to" may not be possible when it requires changing (e.g., re-writing) the application. In addition, using workload class mappings provides flexibility as it allows the user to route a query only when some conditions are met (e.g., route query if the application name begins with "BW").

Elastic Compute Nodes

In the technologies described herein, various types of nodes are involved with executing queries (e.g., SQL queries) in a distributed database environment. In general, a node runs software for performing data processing and/or storage tasks which runs on computing resources of the node (e.g., processor, memory, and/or storage resources).

One type of node is a coordinator node. The coordinator node can serve as the default node for executing SQL queries and can also provide persistent storage of data (e.g., database tables). The coordinator node can also provide routing location hint information (e.g., to client application and/or client libraries).

Another type of node is a worker node. Worker nodes maintain persistent storage of data (e.g., database tables). In some solutions, SQL queries are directed to worker nodes storing the data that is utilized by the SQL queries.

Another type of node is an elastic compute node. In the technologies described herein, elastic compute nodes receive SQL queries and perform compute tasks. However, unlike worker nodes, elastic compute nodes do not persistently store the data used by the SQL queries (i.e., elastic compute nodes do not store persistent database tables). In some implementations, even though elastic compute nodes do not store persistent database tables, they can store replica tables (e.g., replica tables that are read only). In addition, in some implementations elastic compute nodes store caches of intermediate query results (e.g., results which are obtained from query operations performed at other nodes where persistent database tables are stored).

Elastic compute nodes can provide advantages and improve efficiency in a distributed database environment. For example, compute-intensive workloads can be directed to elastic compute nodes, which frees up resources at other nodes (e.g., frees up resources at coordinator nodes which can otherwise become overloaded resulting in slow response times). Elastic compute nodes can use intermediate query results (e.g., from query operators run at other nodes) and perform compute-intensive tasks that would otherwise cause performance issues at other nodes. Compute-intensive tasks can include query operators such as sort operators, join operators, and group by operators. In some implementations, compute-intensive tasks comprise query operators other than table access operators.

Workload Classes

In the technologies described herein, workload classes are used to direct SQL statements to particular nodes. Specifically, users define workload classes that control routing behavior for sets of SQL statements. In some implementations, defining and altering workload classes is performed using SQL statements.

A workload class is created by defining its name and its associated workload mappings and routing location hint. Below is an example of creating the workload class named "ECN_WC." For example, a user could enter the example SQL statement below to create the workload class "ECN_WC."

CREATE WORKLOAD CLASS "ECN_WC";

Workload mappings are then associated with the workload class. Workload mappings define which types of SQL statements will be mapped to the workload class. Below is an example that creates the workload class mapping "ECN_WC_mapping" for the workload class "ECN_WC." For example, a user could enter the example SQL statement below to create the workload class mapping "ECN_WC_mapping."

CREATE WORKLOAD MAPPING "ECN_WC_mapping"
WORKLOAD CLASS "ECN_WC" SET 'APPLICATION NAME'='BW*';

This workload class mapping, "ECN_WC_mapping," maps applications whose names start with "BW" to the workload class "ECN_WC." Using this mapping, SQL statements that are initiated by applications whose names start with "BW" will be routed according to the workload class "ECN_WC."

In general, a workload class can have any number of workload mappings. Workload mappings can be based on various properties associated with the database environment, such as session properties. For example, workload mapping can be based on properties (e.g., session variables and/or other types of properties), including one or more of the following: application properties (e.g., application properties associated with the application that initiates the SQL statements), database object properties (e.g., schema names, table names, etc.), database username (e.g., the username of the user that initiates the SQL statements), application username, and/or application component name.

Next, the ECN nodes that will be used for execution of the workload class are grouped using a group label. Below is an example that groups two ECN nodes (referred to as "ECN_node1" and "ECN_node2") and assigns the label "ECN-group1" to the group. For example, a user could enter the example SQL statement below to create the group "ECN-group1."

ALTER SYSTEM ALTER TABLE PLACEMENT LOCATION ECN_group1 SET (INCLUDE=>'ECN_node1, ECN_node2') WITH RECONFIGURE;

Finally, a routing location hint is defined for the workload class. The routing location hint associates a given workload class with a given group of one or more ECN nodes. Below is an example of a routing location hint that associates the workload class "ECN_WC" with the ECN nodes grouped with the label "ECN_group1." For example, a user could enter the example SQL statement below to create the routing location hint for the workload class "ECN_WC."

ALTER WORKLOAD CLASS "ECN_WC" SET 'ROUTING LOCATION HINT'='ECN_group1';

The routing location hint for a given workload class can be disabled or reenabled at any time. For example, a user can enter the below example SQL statement to disable the routing location hint for the "ECN_WC" workload class (and reenabled it at a later time, or enable it with a different group of ECN nodes, using an ALTER WORKLOAD CLASS statement as described above).

ALTER WORKLOAD CLASS "ECN_WC" UNSET 'ROUTING LOCATION HINT

Using workload classes, a user can define which workloads (e.g., groups of related SQL statements, such as SQL statements associated with a given application) will be processed by specific elastic compute nodes. This allows the user to offload the workloads to the elastic compute nodes (e.g., rather than being processed by the coordinator node). In addition, by using workload classes to route the workloads, routing information is not included with the SQL statements. This allows routing to be changed for a set of SQL statements (e.g., defined by the workload mappings) even for SQL statements (or operators) that are compiled. In addition, routing can be changed for a set of SQL statements without having to alter the SQL statements (e.g., applications software does not have to be revised to include SQL statement routing details).

Example Environment Using a Coordinator Node and Worker Nodes

In some prior art distributed database solutions, SQL routing is performed using a coordinator node and worker nodes. FIG. 1 is an example prior art environment 100, comprising a coordinator node and worker nodes, for routing SQL statements. Specifically, the example prior art environment 100 depicts part of a distributed database environment comprising coordinator node 120, worker node 130, and worker node 140.

The example prior art environment 100 includes a client application 110 and an associated client library 115. The client application 110 comprises software resources for interacting with a distributed database system. The client application 110 can be implemented using various types of software resources (e.g., web browser resources, database client software, etc.) and run on various types of hardware resources (e.g., computing devices such as desktops, servers, and laptops, virtual computing resources, cloud computing resources, etc.). The client application 110 uses a client library 115 for accessing the distributed database system. In some implementations, the client library 115 comprises an application programming interface (API) for accessing the distributed database system. For example, the client library 115 can implemented, at least in part, by an API such as Open Database Connectivity (ODBC), Java Database Connectivity (JDBC), and/or SQL Database Connectivity (SQLDBC).

The example prior art environment 100 depicts part of a distributed database environment (e.g., part of the SAP Hana distributed database environment) in which SQL statements are routed to nodes based on which node has the data (e.g., the database table or tables) needed to execute the SQL statements. Specifically, in the example prior art environment, a set of persistent tables 122 (persistent tables t1, t2, and t3 in this example) are stored at coordinator node 120, a set of persistent tables 132 (persistent tables t4 and t5 in this example) are stored at worker node 130, and a set of persistent tables 142 (persistent tables t6 and t7 in this example) are stored at worker node 140. When client application 110 sends a SQL statement for execution, the client library 115 routes the SQL statement to the node that stores the data needed to execute the SQL statement. As one example, if client library 115 has a SQL statement that uses data from persistent table t1, then client library 115 will send the SQL statement to coordinator node 120, as depicted at 150. As another example, if client library 115 has a SQL statement that uses data from persistent table t6, then client library 115 will send the SQL statement to worker node 140, as depicted at 155.

In some implementations, the client library 115 uses client-side statement routing to determine which node (e.g., which of nodes 120, 130, or 140) to send a given SQL statement to for execution based at least in part on which node stores the data (e.g., database table or tables) needed for execution. For example, the client library 115 can determine the node at SQL compilation time. The client library 115 can cache the determined node so that the same SQL statement can be automatically routed if it is encountered at a later time.

Example Environment Using a Coordinator Node and Elastic Compute Nodes

In the technologies described herein, SQL statement routing is performed within a distributed database environment, comprising elastic compute nodes, using workload classifications. In addition, SQL statements can be routed to elastic compute nodes for execution even though the tables used by the SQL statements are not located at the elastic compute nodes.

Figure 2:
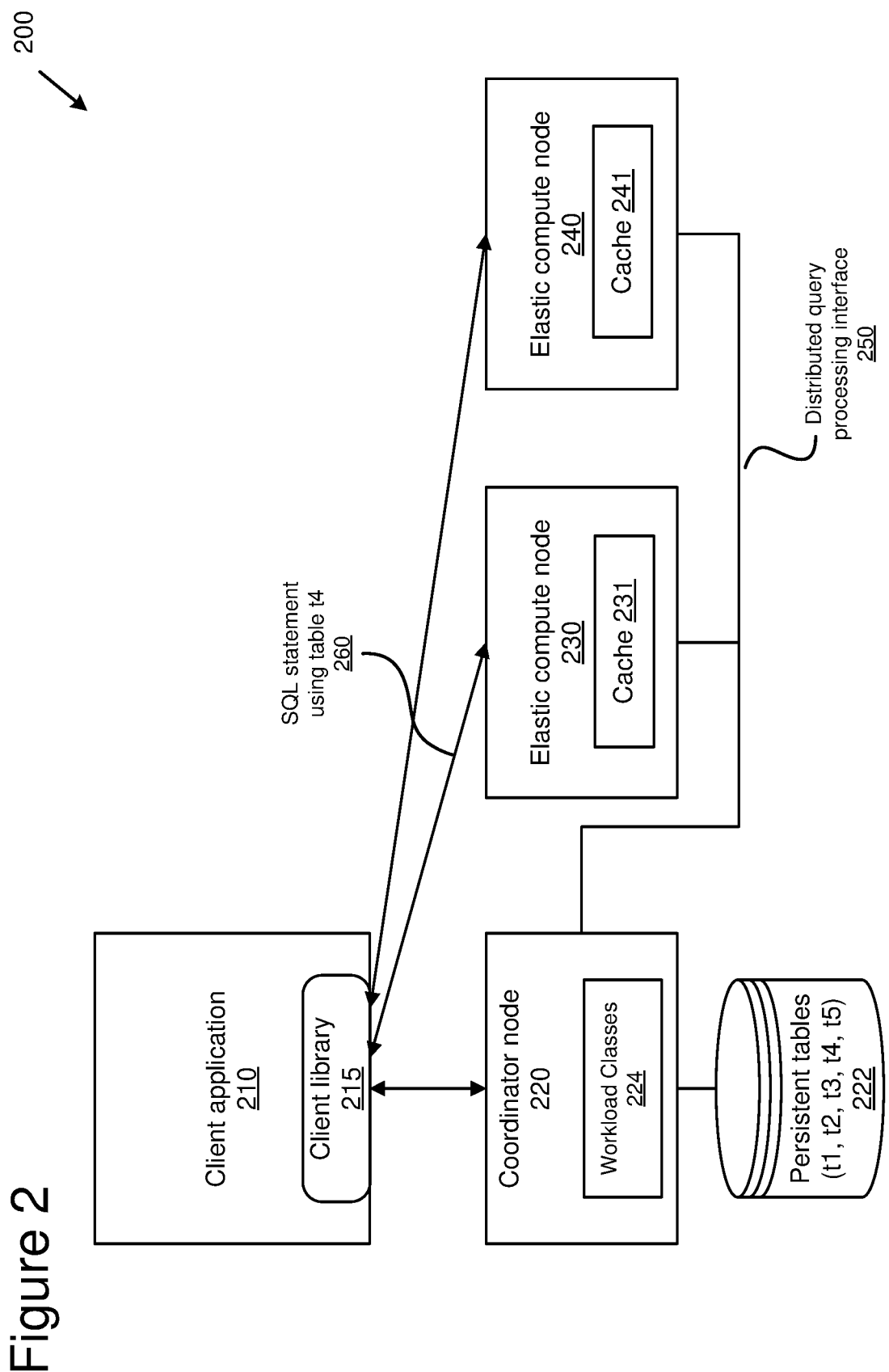
FIG. 2 is an example environment for routing SQL statements, where the environment comprises a coordinator node and elastic compute nodes.

FIG. 2 is an example environment 200, for routing SQL statements, where the environment comprises a coordinator node and elastic compute nodes. Specifically, the example environment 200 depicts part of a distributed database environment comprising coordinator node 220, elastic compute node 230, and elastic compute node 240. In general, a distributed database environment can have any number of elastic compute nodes and/or any number of other nodes (e.g., worker nodes). The example environment 200 depicts how query routing and query execution is performed in a distributed database environment using elastic compute nodes.

The example environment 200 includes a client application 210 and an associated client library 215. The client application 210 comprises software resources for interacting with a distributed database system. The client application 210 can be implemented using various types of software resources (e.g., web server resources, database client software, etc.) and run on various types of hardware resources (e.g., computing devices such as desktops, servers, and laptops, virtual computing resources, cloud computing resources, etc.). The client application 210 uses a client library 215 for accessing the distributed database system. In some implementations, the client library 215 comprises an application programming interface (API) for accessing the distributed database system. For example, the client library 215 can implemented, at least in part, an API such as Open Database Connectivity (ODBC), Java Database Connectivity (JDBC), and/or SQL Database Connectivity (SQLDBC). In some implementations, the client application 210 is a hosted application (e.g., a hosted web application) of the distributed database environment that provides database services to end-user clients (e.g., end-user clients running web browsers).

In the example environment 200, a set of persistent tables 222 (persistent tables t1, t2, t3, t4, and t5) are stored at a coordinator node 220. When client application 210 sends a SQL statement for execution, the client library 215 routes the SQL statement to one of the nodes (e.g., to coordinator node 220, elastic compute node 230, or to elastic compute node 240) for execution. The client library 215 makes its routing decision based on various criteria (e.g., based upon workload classifications, current node utilization, etc.). For example, the client library 215 can receive a SQL statement that uses data from persistent table t4. The client library 215 can route the SQL statement to elastic compute node 230 (e.g., based on workload classification and/or other criteria), as depicted at 260, even though persistent table t4 is not stored at elastic compute node 230. In this situation, elastic compute node 230 can retrieve data for executing the query from coordinator node 220 (which stores persistent table t4). In some implementations, elastic compute node 230 retrieves the data for executing the query using distributed query processing interface 250.

In some implementations, execution of a SQL statement at an elastic compute node involves determining a set of query operators for the SQL statement (e.g., select operators, from operators, group by operators, etc.). When a query operator needs to access data from a persistent table, the query operator can be executed at a node other than the elastic compute node (because persistent tables are not stored at the elastic compute node). In some implementations, the query operator is executed at a coordinator node or at another type of node (other than an elastic compute node) where the persistent table is stored. In some implementations, a distributed query processing interface is used to execute the query operator at the other node and provide the results (e.g., intermediate query results) to the elastic compute node for further processing. For example, with reference to the example environment 200, client library 215 can send SQL statement to elastic compute node 230 for execution, as depicted at 260. Elastic compute node 230 can determine a set of query operators for the SQL statement. If one of the query operators needs to access data in persistent table t4 (e.g., a filter operator), elastic compute node 230 retrieves the data from coordinator node 220 using the distributed query interface 250 (e.g., elastic compute node 230 sends the query operator to coordinator node 220 for execution of the query operator using persistent table t4, and receives an intermediate query result from coordinator node 220). Elastic compute node 230 receives the intermediate query result and performs additional query operators (e.g., sort, join, group by, etc.) to complete execution of the SQL statement. Elastic compute node 230 can return results of executing the SQL statement to client library 215 (e.g., for display by the client application 210 or for sending to an end-user client).

In some implementations, each node has its own query compiler and query optimizer. For example, when elastic compute node 230 receives a SQL statement from client library 215, elastic compute node 230 compiles the SQL statement. The query optimizer running at elastic compute node 230 then decides which query operators to send to other nodes for processing (e.g., based on cost). For example, the query optimizer may send a filter query operator to coordinator node 220 to retrieve an intermediate query result using one of the persistent tables 222 stored at the coordinator node 220. The intermediate query result can be used at elastic compute node 230 to execute other query operators of the SQL statement.

In some implementations, the elastic compute nodes have local caches storing intermediate query results. For example, elastic compute node 230 has local cache 231 storing intermediate query results for SQL statements executed at elastic compute node 230, and elastic compute node 240 has local cache 241 storing intermediate query results for SQL statements executed at elastic compute node 240. The intermediate query results can be re-used from the cache if the same SQL statement (or same query operator) is received again (e.g., without having to send the query operator to the coordinator node 220).

In the example environment 200, client library 215 determines where to send a SQL statement for execution. To make the determination, client library 215 uses workload class information. For example, when client library 215 receives a SQL statement that needs to be routed, client library 215 checks for a matching workload class (e.g., checks workload class mappings for one or more workload classes to determine if one of the mappings matches properties of the SQL statement). Upon finding a matching workload class, client library 215 uses the routing location hint from the identified workload class to determine which node to send the SQL statement to. For example, the routing location hint could identify elastic compute node 240, and in response client library 215 can send the SQL statement to elastic compute node 240 for execution.

In some situations, client library 215 selects a specific elastic compute node from a number of available elastic compute nodes for execution of a given SQL statement. This situation occurs when a workload class is determined for the given SQL statement and the determined workload class has a routing location hint identifying a plurality of elastic compute nodes. When this happens, an elastic compute node, from the plurality associated with the routing location hint, is selected for execution of the given SQL statement. In some implementations, the selected elastic compute node is determined by randomly selecting one of the plurality of elastic compute nodes that are associated with the routing location hint. For example, if the routing location hint for the determined workload class identifies elastic compute nodes 230 and 240, then one of them can be chosen randomly. In other implementations, the elastic compute node is determined by availability (e.g., current load) among the plurality of elastic compute nodes that are associated with the routing location hint (e.g., the least loaded elastic compute node is selected). If there are no available elastic compute nodes for selection (e.g., if they are overloaded), then the SQL statement can be routed to the coordinator node. In other implementations, a combination of these techniques and/or other techniques are used.

Example SQL Statement Routing

Figure 3:
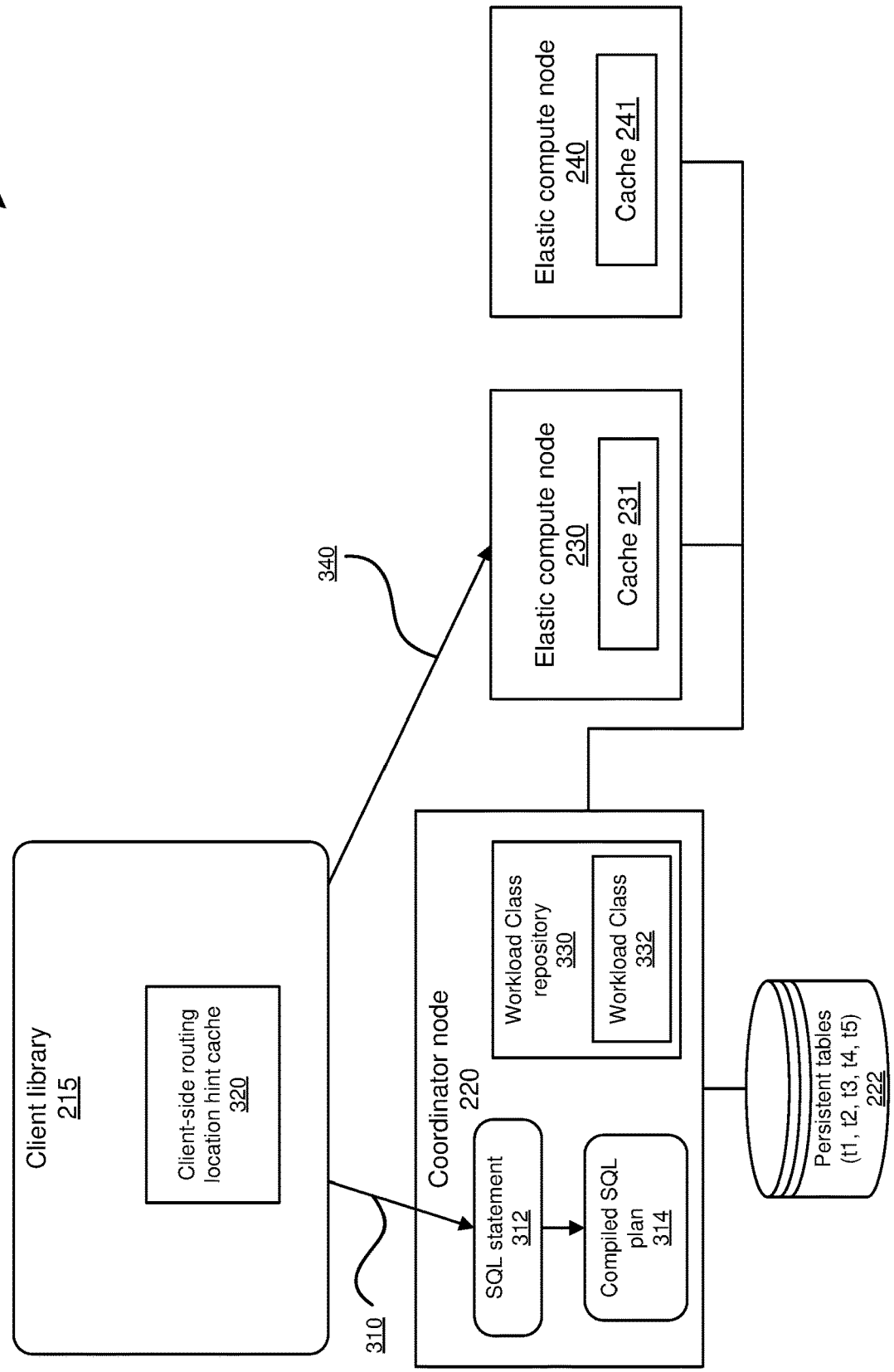
FIG. 3 is a diagram depicting example routing scenarios for routing SQL statements to elastic compute nodes.

FIG. 3 is a diagram depicting example routing scenarios 300 for routing SQL statements to elastic compute nodes. Specifically, in the example routing scenarios 300, a number of operations are depicted for routing SQL statements between client library 215, coordinator node 220, and elastic compute nodes 230 and 240.

In a first operation, a new SQL statement (e.g., not seen at the client library 215 before) is routed from client library 215 to coordinator node 220, as depicted at 310. At the coordinator node 220, the new SQL statement 312 is compiled to generate a compiled SQL plan 314. For example, the new SQL statement 312 can be routed to the coordinator node 220 because there is currently no matching workload class for the new SQL statement 312 (e.g., no routing location hint for the new SQL statement) at the client library 215 (e.g., the coordinator node 220 can be used as a default for routing SQL statements) and the new SQL statement 312 uses persistent table t1, which is located at the coordinator node 220. After the new SQL statement 312 is compiled, the compiled SQL plan 314 is stored in a cache located at the coordinator node. In addition, a workload class 332 that matches the SQL statement 312 is stored at the coordinator node 220 (e.g., the workload class 332 could be created or it could already exist) in workload classes repository 330. Then, the new SQL statement 312 is executed by the coordinator node 220 based on the compiled SQL plan 314.

In a second operation, the results of executing the new SQL statement 312 at the coordinator node 220 are returned to the client library 215, along with the routing location (indicating the coordinator 220). The routing location is stored as a routing location hint at the client library 215 in a client-side routing location hint cache 320. If the same SQL statement is received again at the client library 215

(e.g., based upon some matching criteria, such as statement object identifiers), then it will be routed according to the stored routing location hint in the client-side routing location hint cache 320 (according to the currently stored routing location hint, it would be routed to the coordinator node 220).

In a third operation, an alter workload class command is executed at the coordinator node 220 to change the routing location hint for the workload class 332 stored at the coordinator node 220. For example, the command can be received as a SQL command (e.g., an ALTER WORKLOAD CLASS command) from a user (e.g., from a database administrator). This command alters the routing location hint. In this example, the routing location hint is changed from coordinator node 220 to elastic compute nodes 230 and 240.

In a fourth operation, when the same SQL statement is received again at the client library 215, the client library will route the SQL statement to the coordinator node 220 (based on the routing location hint currently stored in the client-side routing location hint cache 320). The coordinator node 220 will execute the SQL statement. The coordinator node 220 will also determine that the workload class 323 (that matches the SQL statement) has changed (based on the changed routing location hint from the third operation), and send the updated routing location hint for the workload class 332 back to the client library 215 along with results of executing the SQL statement. Alternatively, instead of the coordinator node 220 executing the SQL statement in this operation, the coordinator node 220 can send the updated routing location hint for the workload class 332 back to the client library 215 with an indication that the client library 215 should use the updated routing location hint for executing the SQL statement. The client library 215 would then re-route the SQL statement based on the updated routing location hint (in this example, the updated routing location hint would indicate elastic compute nodes 230 and 240).

In a fifth operation, the client library 215, upon receiving the updated routing location hint, will update the routing location hint stored in its client-side routing location hint cache 320. In this example, the updated routing location hint identifies elastic compute nodes 230 and 240.

In a sixth operation, when the same SQL statement is received again at the client library 215, the client library 215 will use the update routing location hint from its client-side routing location hint cache 320 to route the SQL statement to one of the identified elastic compute nodes 230 or 240. For example, the client library 215 selects elastic compute node 230 (e.g., based on load of elastic compute nodes 230 and 240) and sends the SQL statement, as depicted at 340.

In some implementations, client library (e.g., client library 215) performs SQL statement routing based on prepared statements. In this case, the client library caches prepared statements for reuse if the same prepared statement needs to be executed in the future. In addition, the routing location hints that are stored in the client-side routing location hint cache 320 are associated with prepared statements. For example, client library 215 can receive a routing location hint from the coordinator node 220 where the routing location hint is associated with a given prepared statement. The client library 215 can store the routing location hint in the client-side routing location hint cache 320 along with an indication of which prepared statement it is associated with. When the client library 215 receives a SQL statement that uses the same prepared statement, the client library 215 finds the routing location hint matching the same prepared statement in the client-side routing location hint cache 320 and sends it for execution to the indicated node (e.g., one of the elastic compute nodes 230 or 240).

Methods for Routing SQL Statements to ECNs Using Workload Classes

In the technologies described herein, methods can be provided for routing SQL statements to elastic compute nodes using workload classes within a distributed database environment. The example methods can be implemented using software and/or hardware resources. For example, the methods can be implemented by one or more elements of a distributed database environment, such as by a client application (e.g., client application 210), client library (e.g., client library 215), coordinator nodes (e.g., coordinator node 220), elastic compute nodes (e.g., elastic compute nodes 230 or 240), and/or by other elements of the distributed database environment.

Figure 4:
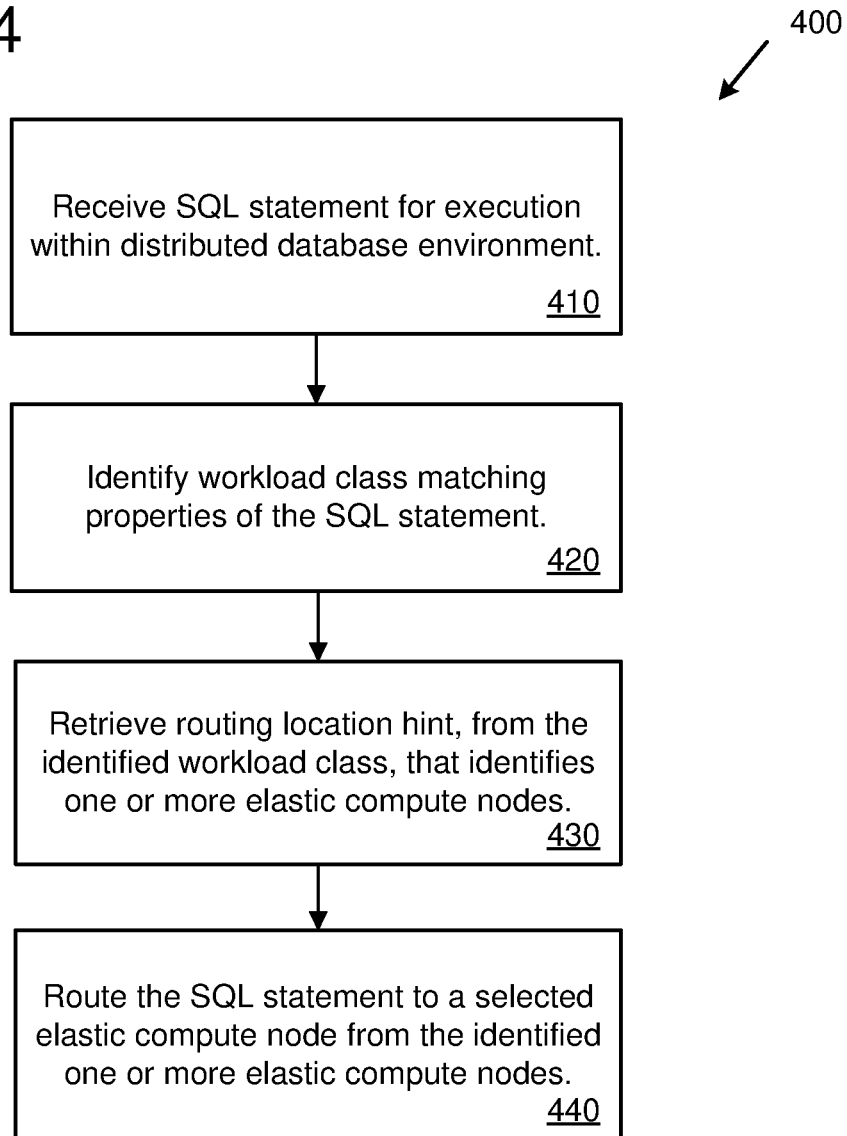
FIG. 4 is a flowchart of an example process for routing structured query language (SQL) statements to elastic compute nodes (ECNs) using workload classes within a distributed database environment.

FIG. 4 is a flowchart of an example process 400 for routing SQL statements to elastic compute nodes using workload classes within a distributed database environment. At 410, a SQL statement is received for execution within the distributed database environment.

At 420, a workload class is identified that matches properties of the SQL statement. The workload class is identified from a number of available workload classes. For example, the workload class can be identified by matching one or more properties (e.g., application name, username, etc.) to workload mappings of the workload classes.

At 430, a routing location hint is retrieved from the identified workload class. The routing location hint identifies one or more elastic compute nodes that are associated with the workload class.

At 440, The SQL statement is routed to a selected elastic compute node from the one or more elastic compute nodes identified by the routing location hint. The SQL statement is executed by the selected elastic compute node. In addition, the selected elastic compute node does not store persistent database tables. Therefore, if execution of the SQL statement at the elastic compute node needs to access any persistent table data, the persistent table data will need to be accessed via a different node (e.g., a coordinator node or another node of the distributed database environment that is not an elastic compute node). For example, the elastic compute node can send at least a portion of the SQL statement (e.g., one or more query operators) to a different node to retrieve database data (e.g., in the form of intermediate results) from persistent database tables stored at the different node.

Figure 5:
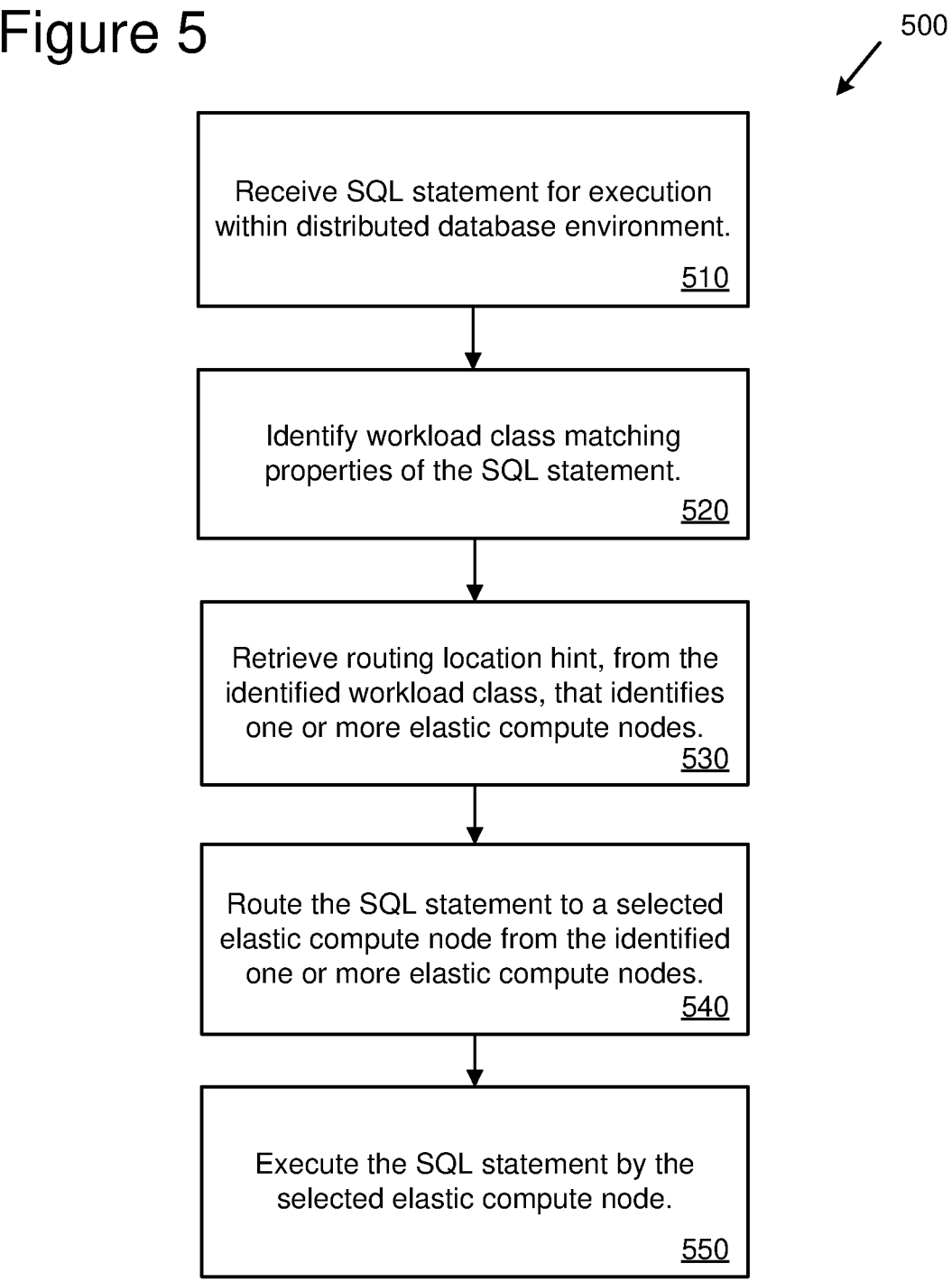
FIG. 5 is a flowchart of an example process for routing SQL statements to ECNs using workload classes within a distributed database environment, including executing the SQL statements at the ECNs.

FIG. 5 is a flowchart of an example process 500 for routing SQL statements to elastic compute nodes using workload classes within a distributed database environment. At 510, a SQL statement is received for execution within the distributed database environment.

At 520, a workload class is identified that matches properties of the SQL statement. The workload class is identified from a number of available workload classes. For example, the workload class can be identified by matching one or more properties (e.g., application name, username, etc.) to workload mappings of the workload classes.

At 530, a routing location hint is retrieved from the identified workload class. The routing location hint identifies one or more elastic compute nodes that are associated with the workload class.

At 540, The SQL statement is routed to a selected elastic compute node from the one or more elastic compute nodes identified by the routing location hint. The SQL statement is routed to the selected elastic compute node even though no persistent database tables are stored at the selected elastic compute node.

At 550, the SQL statement is executed by the selected elastic compute node. The SQL statement uses database data from persistent database tables. Because the elastic compute node does not store persistent database tables, the database data is obtained from other nodes of the distributed database environment. For example, the elastic compute node can send at least a portion of the SQL statement (e.g., one or more query operators) to a different node to retrieve database data (e.g., in the form of intermediate results) from persistent database tables stored at the different node.

In some implementations, database data retrieved by the elastic compute node from other nodes is stored at the elastic compute node (e.g., as a cache of results, such as an intermediate results cache). If the same SQL statement is received again at the elastic compute node, the elastic compute node can obtain the database data from the cache instead of retrieving database data from other nodes.

Computing Systems

Figure 6:
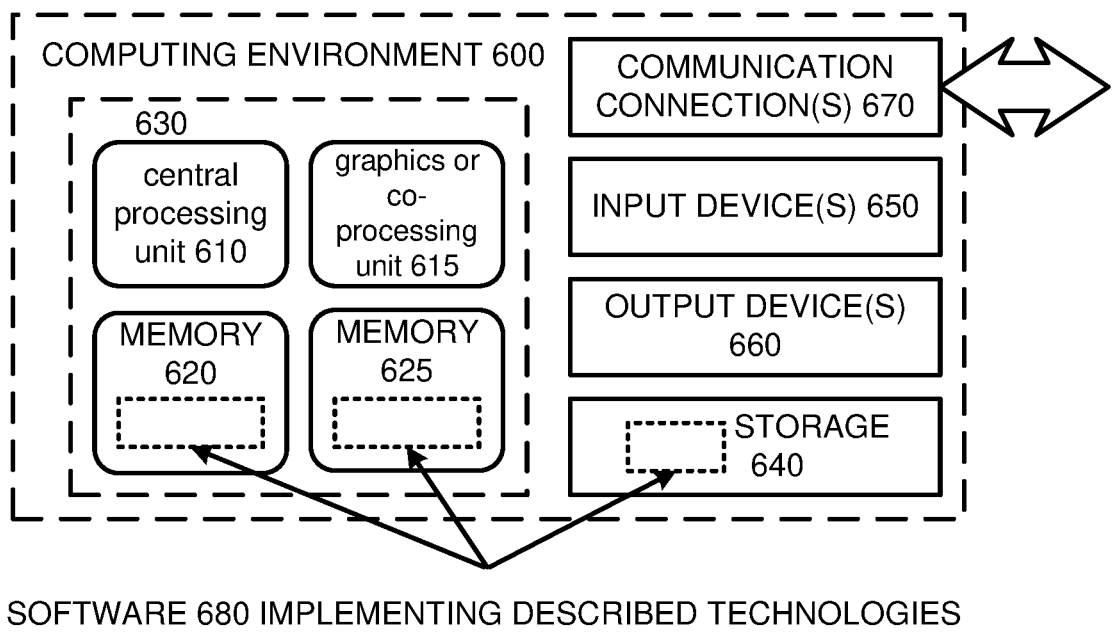
FIG. 6 is a diagram of an example computing system in which some described embodiments can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 7:
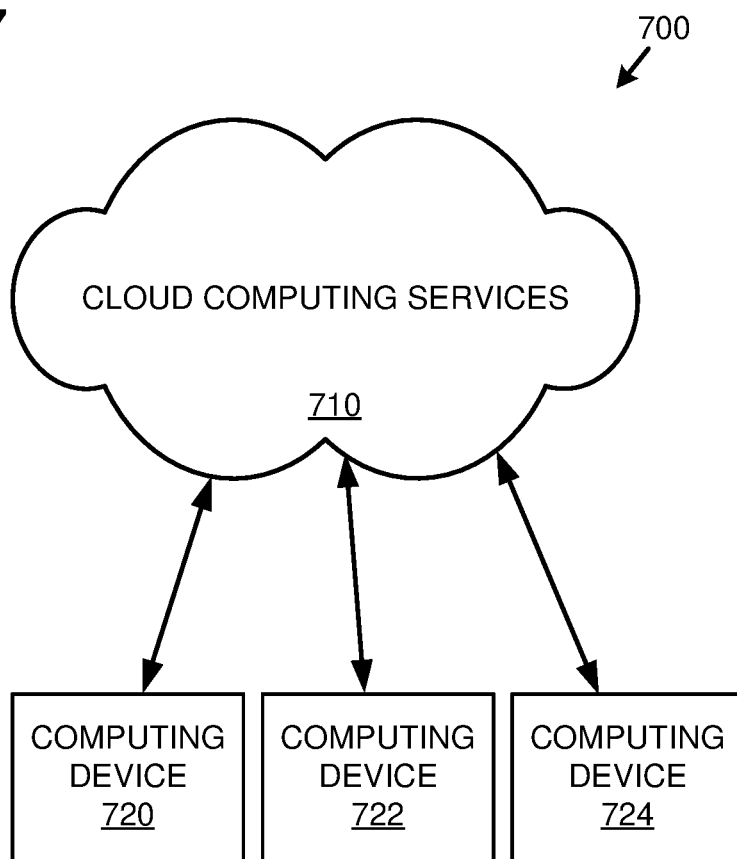
FIG. 7 is an example cloud computing environment that can be used in conjunction with the technologies described herein.

FIG. 7 depicts an example cloud computing environment 700 in which the described technologies can be implemented. The cloud computing environment 700 comprises cloud computing services 710. The cloud computing services 710 can comprise various types of cloud computing resources, such as computer servers, data storage repositories, database resources, networking resources, etc. The cloud computing services 710 can be centrally located (e.g., provided by a data center of a business or organization) or distributed (e.g., provided by various computing resources located at different locations, such as different data centers and/or located in different cities or countries).

The cloud computing services 710 are utilized by various types of computing devices (e.g., client computing devices), such as computing devices 720, 722, and 724. For example, the computing devices (e.g., 720, 722, and 724) can be computers (e.g., desktop or laptop computers), mobile devices (e.g., tablet computers or smart phones), or other types of computing devices. For example, the computing devices (e.g., 720, 722, and 724) can utilize the cloud computing services 710 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 6, computer-readable storage media include memory 620 and 625, and storage 640. The term computer-readable storage media does not include signals and carrier waves. In addition, the term computer-readable storage media does not include communication connections, such as 670.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices comprising processors and memory and configured via computer-executable instructions, for routing structured query language (SQL) statements to elastic compute nodes (ECNs) using workload classes within a distributed database environment, the method comprising:
by the one or more computing devices:
creating a workload class, wherein the workload class comprises a routing location hint, wherein the routing location hint identifies one or more elastic compute nodes that are associated with the workload class;
creating a workload mapping that is associated with the workload class, wherein the workload mapping defines which types of SQL statements are mapped to the workload class based at least in part on properties associated with the SQL statements;
receiving a SQL statement for execution within the distributed database environment, wherein the workload class matches one or more properties of the SQL statement; and
routing the SQL statement to a selected elastic compute node of the one or more elastic compute nodes identified by the routing location hint of the workload class, wherein the SQL statement is executed by the selected elastic compute node, and wherein the selected elastic compute node does not store persistent database tables.

2. The method of claim 1, wherein the database environment comprises a coordinator node and the one or more elastic compute nodes, and wherein the SQL statement uses data from a persistent database table stored at the coordinator node.

3. The method of claim 1, wherein the workload class is created by a user using SQL commands.

4. The method of claim 1, further comprising:
executing the SQL statement at the selected elastic compute node, the executing comprising:
sending at least a portion of the SQL statement to another node for execution, wherein the another node stores a persistent database table needed for execution of the SQL statement; and receiving, from the another node, results of execution of the at least a portion of the SQL statement.

5. The method of claim 1, further comprising:

executing the SQL statement at the selected elastic compute node, the executing comprising:
  determining a set of query operators for executing the SQL statement;
  sending at least one query operator, of the set of query operators, to another node for execution, wherein the another node stores a persistent database table needed for execution of the at least one query operator; and
  executing all remaining query operators, other than the at least one query operator, at the selected elastic compute node.

6. The method of claim 5, wherein executing the SQL statement at the selected elastic compute node further comprises:

receiving, from the another node, intermediate query results from execution of the at least one query operator at the another node.

7. The method of claim 1, further comprising:

executing the SQL statement at the selected elastic compute node, the executing comprising:
  determining a set of query operators for executing the SQL statement;
  determining that one or more query operators, of the set of query operators, access data in a persistent database table located at another node;
  responsive to determining that the one or more query operators access data in a persistent database table located at another node, sending the one or more query operators to the another node for execution;
  receiving from the another node, results of executing the one or more query operators; and
  executing all remaining query operators, other than the one or more query operators, at the selected elastic compute node.

8. The method of claim 1, wherein the method is performed, at least in part, by a client library and/or by a coordinator node.

9. The method of claim 1, wherein the selected elastic compute node retrieves database data needed to execute the SQL statement from other nodes of the distributed database environment.

10. The method of claim 1, wherein the workload mapping is created by a user using SQL commands.

11. The method of claim 1, wherein the workload class supports a plurality of different workload mappings, including the workload mapping.

12. One or more computing devices comprising:
  processors; and
  memory;
  the one or more computing devices configured, via computer-executable instructions, to route structured query language (SQL) statements to elastic compute nodes (ECNs) using workload classes within a distributed database environment, the operations comprising:
    creating a workload class, wherein the workload class comprises a routing location hint, wherein the routing location hint identifies one or more elastic compute nodes that are associated with the workload class;
    creating a workload mapping that is associated with the workload class, wherein the workload mapping defines which types of SQL statements are mapped to the workload class based at least in part on properties associated with the SQL statements;
    receiving a SQL statement for execution within the distributed database environment, wherein the workload class matches one or more properties of the SQL statement;
    routing the SQL statement to a selected elastic compute node of the one or more elastic compute nodes identified by the routing location hint of the workload class; and
    executing, by the selected elastic compute node, the SQL statement, wherein the SQL statement uses one or more persistent database tables that are not stored at the selected elastic compute node.

13. The one or more computing devices of claim 12, wherein executing the SQL statement by the selected elastic compute node comprises:

sending at least a portion of the SQL statement to one of the other nodes for execution, wherein the other node stores a persistent database table needed for execution of the at least a portion of the SQL statement; and receiving, from the other node, results of execution of the at least a portion of the SQL statement.

14. The one or more computing devices of claim 13, the operations further comprising:

storing the received results of execution of the at least a portion of the SQL statement in a cache located at the selected elastic compute node, wherein the stored results are re-used when a same SQL statement is received at the elastic compute node.

15. The one or more computing devices of claim 12, wherein executing the SQL statement by the selected elastic compute node comprises:

determining a set of query operators for executing the SQL statement;

sending at least one query operator, of the set of query operators, to one of the other nodes for execution, wherein the other node stores a persistent database table needed for execution of the at least one query operator;

receiving, from the other node, intermediate query results from execution of the at least one query operator at the other node; and executing all remaining query operators, other than the at least one query operator, at the selected elastic compute node.

16. The one or more computing devices of claim 12, wherein the workload class and workload mapping are created by a user using SQL commands.

17. One or more computer-readable storage media storing computer-executable instructions for execution on one or more computing devices to perform operations for routing structured query language (SQL) statements to elastic compute nodes (ECNs) using workload classes within a distributed database environment, the operations comprising:

creating a workload class, wherein the workload class comprises a routing location hint, wherein the routing location hint identifies one or more elastic compute nodes that are associated with the workload class;

creating a workload mapping that is associated with the workload class, wherein the workload mapping defines which types of SQL statements are mapped to the workload class based at least in part on properties associated with the SQL statements;

receiving a SQL statement for execution within the distributed database environment, wherein the workload class matches one or more properties of the SQL statement;

routing the SQL statement to a selected elastic compute node of the one or more elastic compute nodes identified by the routing location hint of the workload class; and executing, by the selected elastic compute node, the SQL statement, wherein the SQL statement uses one or more persistent database tables that are not stored at the selected elastic compute node.

18. The one or more computer-readable storage media of claim 17, wherein executing the SQL statement by the selected elastic compute node comprises:

sending at least a portion of the SQL statement to one of the other nodes for execution, wherein the other node stores a persistent database table needed for execution of the at least a portion of the SQL statement; and receiving, from the other node, results of execution of the at least a portion of the SQL statement.

19. The one or more computer-readable storage media of claim 18, the operations further comprising:

storing the received results of execution of the at least a portion of the SQL statement in a cache located at the selected elastic compute node, wherein the stored results are re-used when a same SQL statement is received at the elastic compute node.

20. The one or more computer-readable storage media of claim 17, wherein executing the SQL statement by the selected elastic compute node comprises:

determining a set of query operators for executing the SQL statement;

sending at least one query operator, of the set of query operators, to a coordinator node for execution, wherein the coordinator node stores a persistent database table needed for execution of the at least one query operator;

receiving, from the coordinator node, intermediate query results from execution of the at least one query operator at the coordinator node;

storing the intermediate query results in a cache at the selected elastic compute node; and executing all remaining query operators, other than the at least one query operator, at the selected elastic compute node.

* * * * *